US011044727B2

(12) United States Patent
Hedayat et al.

(10) Patent No.: US 11,044,727 B2
(45) Date of Patent: Jun. 22, 2021

(54) APPARATUS AND METHODS FOR EFFICIENT WIRELESS CHANNEL USAGE

(71) Applicant: NEWRACOM, INC., Lake Forest, CA (US)

(72) Inventors: Ahmad Reza Hedayat, Aliso Viejo, CA (US); Young Hoon Kwon, Laguna Niguel, CA (US)

(73) Assignee: ATLAS GLOBAL TECHNOLOGIES LLC, Frisco, TX (US)

( * ) Notice: Subject to any disclaimer, the term of this patent is extended or adjusted under 35 U.S.C. 154(b) by 0 days.

(21) Appl. No.: 16/198,628

(22) Filed: Nov. 21, 2018

(65) Prior Publication Data

US 2019/0110297 A1 Apr. 11, 2019

Related U.S. Application Data

(63) Continuation of application No. 15/059,237, filed on Mar. 2, 2016, now Pat. No. 10,172,137.

(60) Provisional application No. 62/127,248, filed on Mar. 2, 2015, provisional application No. 62/264,160, filed on Dec. 7, 2015, provisional application No. 62/268,422, filed on Dec. 16, 2015, provisional application No. 62/270,469, filed on Dec. 21, 2015.

(51) Int. Cl.
*H04W 72/04* (2009.01)
*H04W 74/02* (2009.01)
*H04W 72/08* (2009.01)
*H04W 74/08* (2009.01)
*H04W 74/00* (2009.01)

(52) U.S. Cl.
CPC ..... *H04W 72/0473* (2013.01); *H04W 72/085* (2013.01); *H04W 74/02* (2013.01); *H04W 74/006* (2013.01); *H04W 74/0808* (2013.01)

(58) Field of Classification Search
CPC ............. H04W 72/0473; H04W 74/02; H04W 72/085; H04W 74/006; H04W 74/0808
See application file for complete search history.

(56) References Cited

U.S. PATENT DOCUMENTS

2017/0118725 A1* 4/2017 Chu ..................... H04W 52/367
2018/0146469 A1* 5/2018 Luo ......................... H04L 69/22
2018/0220456 A1* 8/2018 Kim .................. H04W 74/0808

OTHER PUBLICATIONS

"Part 11—Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Thai Nguyen

(57) ABSTRACT

A multi-user uplink transmission is performed by analyzing, by a first wireless station, a spatial reuse field in a first frame, and generating, by the first wireless station, a second frame, wherein the second frame includes a spatial reuse field that is generated based on the spatial reuse field of the first frame. The first frame and the second frame are within the same transmission opportunity (TXOP) and the first frame is transmitted prior to the second frame during the TXOP.

18 Claims, 8 Drawing Sheets

(56) References Cited

OTHER PUBLICATIONS

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

* cited by examiner

APPARATUS AND METHODS FOR EFFICIENT WIRELESS CHANNEL USAGE

CROSS-REFERENCE TO RELATED APPLICATION

This application is a continuation of application Ser. No. 15/059,237, filed Mar. 2, 2016, which claims the benefit of U.S. Provisional Applications No. 62/127,248, filed on Mar. 2, 2015, No. 62/264,160, filed on Dec. 7, 2015, No. 62/268,422, filed on Dec. 16, 2016, and No. 62/270,469, filed on Dec. 21, 2015, the contents of which are incorporated herein by reference.

BACKGROUND

1. Technical Field

The technology described herein relates generally to wireless networking. More particularly, the technology relates to clear channel assessment and a spatial reuse field.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices and increased throughput.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac).

Recently, an amendment focused on providing a high efficiency WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

In some circumstances, system throughput can be improved by taking a more aggressive approach to clear channel assessment (CCA). However, increasing a CCA threshold value may result in more frequent packet collisions and degradation of Quality of Service (QoS) of the packet delivery. In particular, when a STA uses a more aggressive CCA threshold and another STA in the same BSS is already transmitting data to an AP, the transmission may fail because the AP is currently receiving data from the other STA.

In addition, aggressive CCA may create fairness issues for legacy STAs. STAs that use more aggressive CCA may occupy and dominate a channel while legacy STAs determine that the channel is occupied.

The throughput gain of aggressive CCA comes from increased use of simultaneous transmissions. However, more simultaneous transmissions implies more interference during a frame exchange. Even though the effective data rate of each individual transmission may be lowered due to increased interference, overall throughput may increase for the system by allowing additional parallel transmissions or spatial reuse. The presence of increased interference is another factor limiting the utility of CCA.

SUMMARY

A method for performing a multi-user uplink transmission includes analyzing, by a first wireless station, a spatial reuse field in a first frame, and generating, by the first wireless station, a second frame, wherein the second frame includes a spatial reuse field that is generated based on the spatial reuse field of the first frame, wherein the first frame and the second frame are within the same transmission opportunity (TXOP) and the first frame is transmitted prior to the second frame during the TXOP. The first frame may immediately precede the second frame. The first frame may be transmitted by the first wireless station.

In an embodiment, the method further includes receiving, by the first wireless device from a second wireless device, the first frame, wherein the second frame is a response frame to the first frame. In an embodiment, the spatial reuse field of the second frame includes a transmit power indication.

In an embodiment, the first frame is an initiating frame of the TXOP and the first frame includes clear channel assessment information in the spatial reuse field while the spatial reuse field of the second frame includes transmit power information or clear channel assessment information. The spatial reuse field of the second frame may be a copy of the spatial reuse field of the first frame.

A method for performing a multi-user uplink transmission includes assessing, by an access point, a wireless channel using clear channel assessment parameters, determining spatial reuse information based on the assessment of the wireless channel, and generating a trigger frame wherein the trigger frame includes resource allocation information for the first wireless station and a second wireless station to participate in the multi-user uplink transmission to the access point, wherein the trigger frame further includes the spatial reuse information, the spatial reuse information to be used by the first wireless station and the second wireless station for setting a spatial reuse field in the multi-user uplink transmission.

In an embodiment, the spatial reuse information is located in the payload of the trigger frame. In another embodiment, the spatial reuse information is located in the physical layer header of the trigger frame.

The spatial reuse information may include one or more of accepted interference level, transmit power, and clear channel assessment level. The spatial reuse information may be a function of a spatial use field of a physical layer header of the trigger frame.

A method for assessing a wireless channel includes receiving, by a first wireless station from a second wireless station, a first frame over the wireless channel, detecting transmit power information in the first frame, wherein the transmit power information indicates a power at which the second wireless station transmitted the first frame, adjusting a clear channel assessment threshold based on the transmit power information detected in the first frame and a transmit power of the first wireless station, and performing clear channel assessment based on the adjusted clear channel assessment threshold.

In an embodiment, the transmit power of the second wireless station is located in a spatial reuse field of a physical layer header of the first frame. Adjusting the clear channel assessment threshold may include determining a difference between the transmit power indicated in the first frame and the transmit power of the first wireless station, and adjusting the clear channel assessment threshold based on the determined difference.

In an embodiment, when the transmit power of the first wireless station is larger than the transmit power indicated in the first frame, the adjusting the clear channel assessment threshold based on the determined difference includes subtracting the determined difference from the clear channel assessment threshold. In an embodiment, adjusting the clear channel assessment threshold includes determining that a color field indicated in the first frame is identical to a color field associated with the first wireless station, wherein the determining the difference is performed in response to determining the color field indicated in the first frame is identical to the color field associated with the first wireless station.

DETAILED DESCRIPTION

Figure 1:
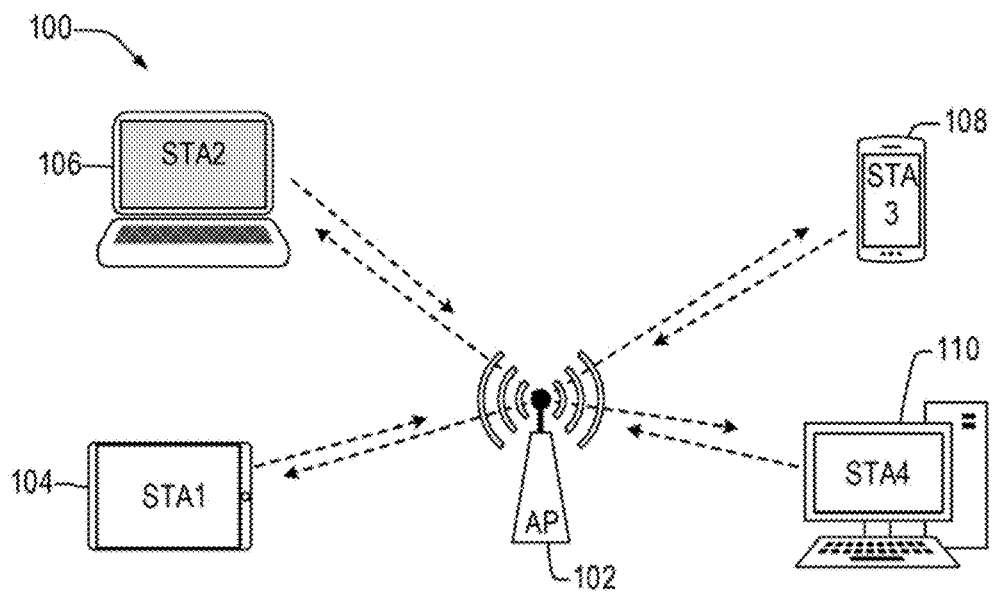
FIG. 1 illustrates a wireless network according to an embodiment.

Embodiments of the present disclosure relate generally to wireless networking, and more particularly, to increasing an available decode time (that is, an amount of time available to decode and process) of a symbol that has been received over a wireless network.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 102 (also referred to as AP) wirelessly communicating with first, second, third, and fourth wireless devices (or stations) 104, 106, 108, and 110 (also referred to as STA1, STA2, STA3, and STA4, respectively). The wireless devices may each include a medium access control layer (MAC) and a physical layer (PHY) according to an IEEE 802.11 standard.

Although the example of FIG. 1 shows only the BSS 100 including only the first to fourth stations STA1 to STA4, embodiments are not limited thereto and may comprise BSSs including any number of STAs.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports Spatial Division Multiple Access (SDMA), two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and the transceiver may be implemented in each of the stations STA1 to STA4 and the AP 102 using respective hardware components, software components, or both.

AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 102, such as when a cellular phone is configured to operate as a wireless "hot spot."

Each of stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the frame, as prescribed in the applicable standard.

Figure 2:
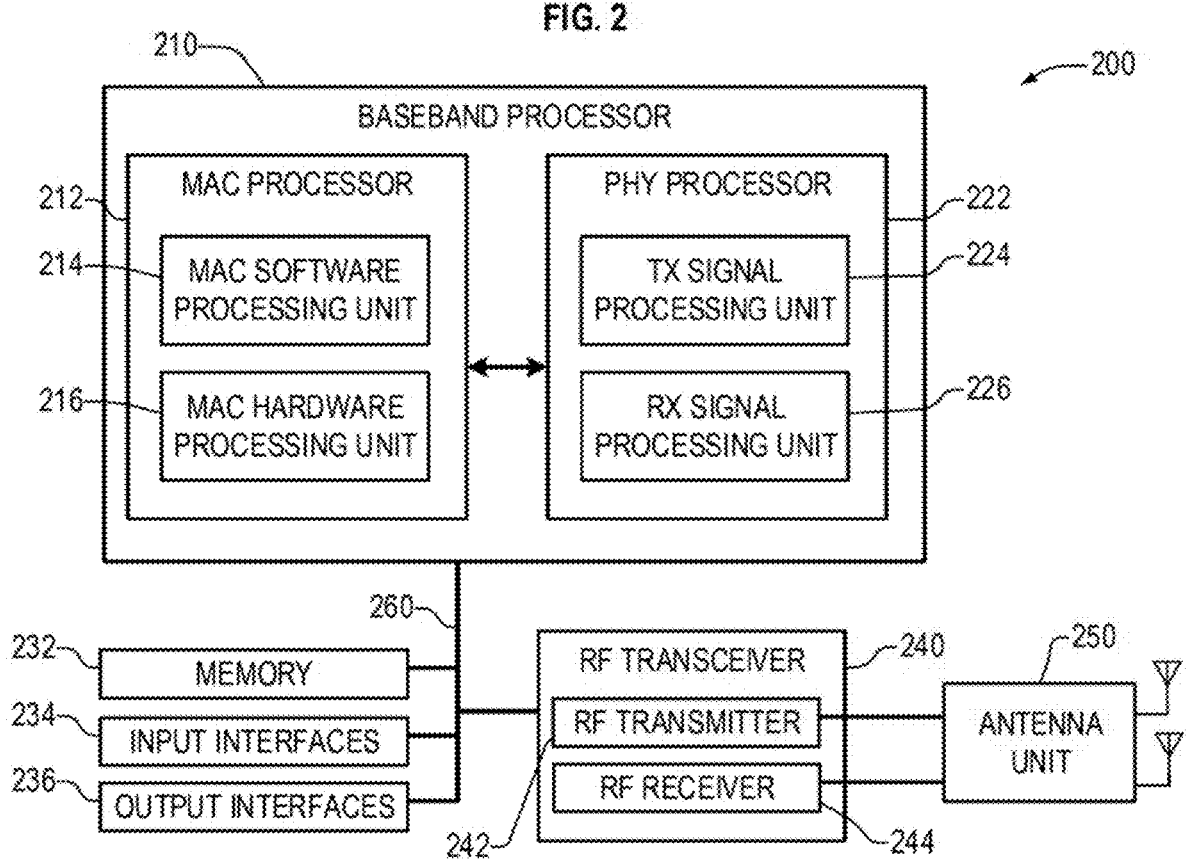
FIG. 2 is a schematic diagram of a wireless device according to an embodiment.

FIG. 2 illustrates a schematic block diagram of a wireless device 200 according to an embodiment. The wireless or WLAN device 200 can represent any device in a BSS, e.g., the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation.

Functions performed by the transmitting signal processing unit 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Aggressive Clear Channel Assessment

Embodiments of the present disclosure relate to aggressive clear channel assessment (CCA), and how aggressive CCA states are communicated and expressed in a wireless network. In an embodiment, a frame may include an indication of whether aggressive CCA is permitted. When a STA receives a frame that indicates aggressive CCA is permitted, the STA may assess the channel using an aggressive threshold value.

On the other hand, a frame may be transmitted that includes an indication that aggressive CCA is not permitted by receivers. When this is the case, the receiving STA may perform CCA without applying an aggressive CCA threshold. For example, a default value (or a non-aggressive CCA threshold value) of −82 dBm may be used.

The processes and devices described by this disclosure may be applied to various forms of CCA. The present disclosure discusses power level threshold as the mechanism for determining channel occupancy. However, there are multiple different CCA mechanisms that are defined in various IEEE 802.11 specifications, and persons of skill in the art will appreciate that the concepts of this disclosure can be readily extended to and combined with other CCA criteria such as energy detection based CCA criteria.

Figure 3:
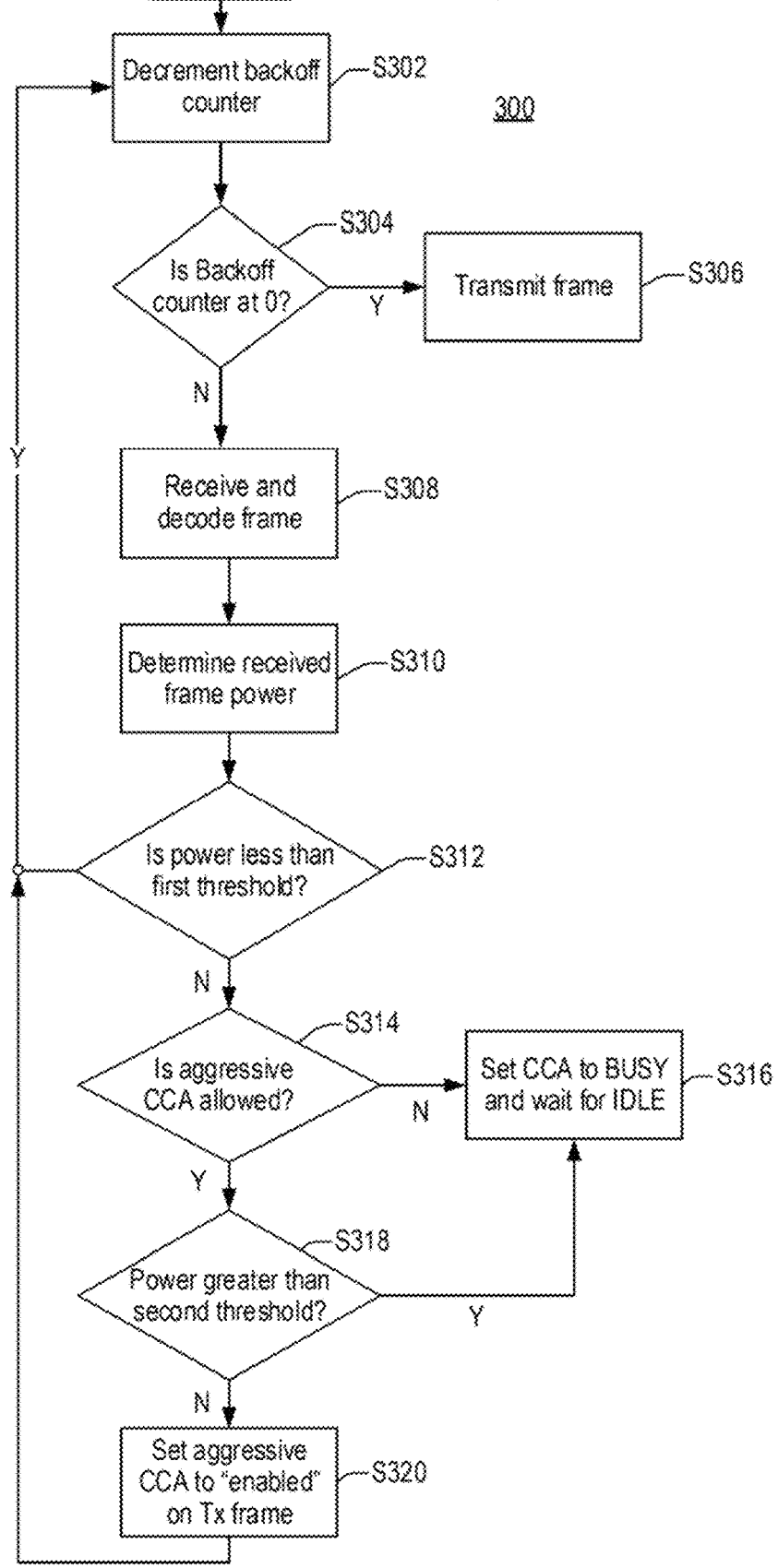
FIG. 3 illustrates an embodiment of a CCA process.

FIG. 3 illustrates a CCA process 300 according to an embodiment. Process 300 may be performed by a STA with a pending transmission in a wireless network. As indicated in the figure, the STA may start process 300 in a state in which the channel is assessed to be IDLE.

Following initial assessment of the channel as IDLE using one or more channel assessment mechanisms, a backoff counter is initiated, and decremented at S302 according to a backoff time. A value of the backoff counter is determined at S304, and when the backoff counter reaches zero, a frame may be transmitted at S306. In an embodiment, the frame is only transmitted at S306 when the counter reaches zero and meets other conditions of process 300 (i.e., the channel remains IDLE). Otherwise, the channel may be determined to be BUSY.

While the backoff timer of the STA of FIG. 3 is counting down, the STA may receive a frame at S308. The frame may have been transmitted by a second STA. When the STA performing CCA for the received frame, it may decode some or all of the frame at S308, and determine a power in dBm of the received frame at S310.

The STA may then compare the power level of the frame determined at S310 to a first threshold value at S312. The first threshold value is a parameter that the STA uses to assess whether a channel is clear/idle under CCA. The first threshold value may be a first CCA threshold value, which may also be a default, or non-aggressive CCA value. For example, in an embodiment, the first threshold value may be −82 dBm for a 20 MHz PLCP Protocol Data Unit (PPDU), −79 dBm for a 40 MHz (PPDU), −76 dBm for a 80 MHz (PPDU), and −73 dBm for a 160 MHz (PPDU). However, it should be recognized that other values are possible. In another embodiment, the default value may be a variable value.

If the power of the frame received at S308 is lower than the first CCA threshold value, then the CCA state is maintained at IDLE, and if no other frames are received before the counter reaches zero at S304, then the STA transmits a frame at S306.

If the power of the received frame exceeds the first threshold value, then process 300 may proceed to determining whether aggressive CCA is indicated in the received frame at S314. Determining whether aggressive CCA is indicated in the received frame may include examining decoded content of the received frame to determine whether the STA is permitted to use aggressive CCA. For example, the STA may read one or more bits of a frame header to determine whether the STA that transmitted the frame permitted use of an aggressive CCA scheme by other STAs (i.e., an aggressive CCA indication).

In a specific embodiment, the STA decodes an aggressive CCA indication value in a High Efficiency signaling field (e.g., HE-SIG-A field). The aggressive CCA indication may include a binary indication such as whether or not the receiving STA is permitted to use aggressive CCA. In other embodiments, the CCA indication may include additional information, such as whether or not aggressive CCA is permitted for particular frames of a plurality of frames.

Upon detecting that an aggressive CCA is permitted, the power of the received frame may be compared to a second threshold value at S318. The second threshold value may be an aggressive CCA value, which is a higher power level than the first threshold value of S312. For example, in an embodiment, the aggressive CCA values may be 3, 7, or 10 dBm higher than the first CCA threshold values (e.g., −79 dBm, −75 dBm, and −72 dBm).

In some embodiments, aggressive CCA operations are only performed when data in the received frame indicates that aggressive CCA is permitted by the receiving STA. Thus, in some embodiments, S318 is only performed when the power of the frame received by the STA is determined to exceed the first threshold value at S312.

If the received power is higher than the second CCA threshold value, then the STA's CCA result is set to BUSY at S316, and the STA waits until the wireless channel becomes IDLE again to initiate another backoff process.

On the other hand, if the power of the received frame does not exceed the aggressive CCA threshold value, and aggressive CCA was determined to be allowed at S314, then the STA may perform subsequent actions. The STA may set its CCA result to IDLE and to continue the backoff process. If this action is performed, the backoff counter continues to count down until it reaches zero if CCA results remains in IDLE during this backoff period, at which point the STA transmits a frame. The second action is that the CCA result is determined to be BUSY at S316.

In addition, at S320, the STA may encode the pending frame with data indicating that STA that receive the frame are permitted to use aggressive CCA thresholds. In other words, the STA may set an aggressive CCA data field in a header of the subsequently transmitted frame to indicate that aggressive CCA is permitted (i.e., CCA thresholds that are higher than a default or traditional CCA threshold).

In a conventional process of a system that does not recognize aggressive CCA, the power of the received frame is only compared to a single conventional CCA threshold value in S312, and instead of performing S314 when the threshold is exceeded, the process would skip to S316 and determine that the channel is BUSY.

In an embodiment, when a STA enables aggressive CCA for a frame as indicated in S320, the Modulation and Coding Scheme (MCS) of the frame may be set such that a target receiver of the frame can decode the packet even under anticipated interference. On the other hand, if aggressive CCA is not enabled at S320, then the MCS of a subsequently transmitted frame may be set to a scheme that has higher throughput but is more sensitive to interference. In other words, when a STA determines that aggressive CCA is being used, the MCS for transmitted frames may be adapted to the anticipated levels of interference.

In an embodiment, CCA sensitivity for signals occupying the primary 20 MHz channel may be determined in accordance with the following Table 1. In Table 1, the CCA threshold value for aggressive CCA, which is shown as "Th$_1$," is a predetermined value that is greater than −82 dBm.

The PHY may issue a PHY-CCA.indication(BUSY, {primary}) primitive if one of the conditions listed in Table 1 below is met in an otherwise idle 20 MHz, 40 MHz, 80 MHz, 160 MHz, or 80+80 MHz operating channel width. The PHY may detect the start of a PPDU that occupies at least the primary 20 MHz channel with >90% probability under the conditions listed in Table 1 below within a period of aCCATime and hold the CCA signal busy (PHY_CCA.indicate(BUSY, channel-list) primitive) for the duration of the PPDU when the threshold is exceeded. Although Table 1 uses specific signal strength values, it should be recognized that these are provided to help illustrate implementations of the present disclosure, and embodiments are not limited to these values.

In an embodiment, if a STA identifies more than one frame while assessing the wireless medium at S308, the STA may decode and analyze every received frame. In such an embodiment, when one or more of the identified frames has an indication that aggressive CCA is not enabled, then the

TABLE 1

| Operating Channel Width | Conditions |
|---|---|
| 20 MHz, 0 MHz, 80 MHz, 160 MHz, or 80 + 80 MHz | The start of a 20 MHz NON_HT PPDU in the primary 20 MHz channel as defined in OFDM PHY specification. The start of an HT PPDU under the conditions defined in HT PHY specification. The start of a 20 MHz VHT PPDU in the primary 20 MHz channel at as defined in VHT PHY specification. The start of a 20 MHz HE PPDU in the primary 20 MHz channel at or above −82 dBm if the PPDU indicates aggressive CCA is not allowed. The start of a 20 MHz HE PPDU in the primary 20 MHz channel at or above $Th_1$ dBm if the PPDU indicates aggressive CCA is allowed. |
| 40 MHz, 80 MHz, 160 MHz, or 80 + 80 MHz | The start of a 40 MHz non-HT duplicate or VHT PPDU in the primary 40 MHz channel at or above −79 dBm. The start of an HT PPDU under the conditions defined in HT PHY specification. The start of a 40 MHz HE PPDU in the primary 40 MHz channel at or above −79 dBm if the PPDU indicates aggressive CCA is not allowed. The start of a 40 MHz HE PPDU in the primary 40 MHz channel at or above $Th_1$ + 3 dBm if the PPDU indicates aggressive CCA is allowed. |
| 80 MHz, 160 MHz, or 80 + 80 MHz | The start of an 80 MHz non-HT duplicate or VHT PPDU in the primary 80 MHz channel at or above −76 dBm. The start of a 80 MHz HE PPDU in the primary 80 MHz channel at or above −76 dBm if the PPDU indicates aggressive CCA is not allowed. The start of a 80 MHz HE PPDU in the primary 80 MHz channel at or above $Th_1$ + 6 dBm if the PPDU indicates aggressive CCA is allowed. |
| 160 MHz or 80 + 80 MHz | The start of an 160 MHz or 80 + 80 MHz non-HT duplicate or VHT PPDU at or above −73 dBm. The start of an 160 MHz or 80 + 80 MHz HE PPDU at or above −73 dBm if the PPDU indicates aggressive CCA is not allowed. The start of an 160 MHz or 80 + 80 MHz HE PPDU at or above $Th_1$ + 6 dBm if the PPDU indicates aggressive CCA is allowed. |

The receiver may issue a PHY-CCA.indication(BUSY, {primary}) primitive for any signal that exceeds a threshold equal to 20 dB above the minimum modulation and coding rate sensitivity (−82+20 = −62 dBm) in the primary 20 MHz channel within a period of aCCATime after the signal arrives at the receiver's antenna(s), in which case the receiver does not issue a PHY-CCA.indication(BUSY, {secondary}), PHYCCA.indication(BUSY, {secondary40}), PHY-CCA.indication(BUSY,{secondary80}), or PHYCCA.indication(IDLE) primitive while the threshold continues to be exceeded.

In one embodiment, if a STA wants to access the channel with an increased CCA threshold and transmit a first frame, the STA indicates in the first frame that the receivers of the first frame are allowed to increase the CCA threshold. Specifically, the STA may encode one or more bits of a header in a transmitted frame, such as a HE-SIG-A or HE-SIG-B field to indicate that a STA that receives the frame has permission to use aggressive CCA.

In an embodiment, even though a CCA threshold for signal detection criteria is increased under aggressive CCA, the aggressive CCA threshold for energy detection criteria is the same. In other words, when aggressive CCA is enabled, a STA uses higher thresholds for signal detection, but maintains the same thresholds that are used for non-aggressive energy detection.

In an embodiment, if a STA identifies a frame while assessing the wireless medium at S308, and the frame indicates that the receiver of the frame is not allowed to increase a CCA threshold at S314, the STA does not use an increased CCA threshold value for assessing the medium.

STA will not use the aggressive CCA threshold value for the frame transmission. In other words, when multiple frames are received and decoded at S308 during a single IDLE period and any one of the received frames does not indicate that aggressive CCA is enabled at S314, then the STA uses the lower, non-aggressive CCA threshold value at S312 for assessing a channel, and does not perform S318 and S320 of process 300.

In an embodiment, STA that are capable of performing process 300 may be present in the same geographic area as STA that are not capable of performing process 300. For example, legacy STA may be present in the same BSS or an OBSS of a STA that can perform process 300. In such an embodiment, when a STA that can perform process 300 receives a frame from a legacy STA that does not support process 300, the frame from the legacy STA is interpreted as not indicating the aggressive CCA is allowed.

With reference to FIG. 3, in such an embodiment, the receiving STA receives and decodes the frame from a legacy STA at 308. The STA performing process 300 may determine that the frame has been sent by a legacy or non-supporting STA when the header does not include data indicating whether aggressive CCA is permitted by receiving STA. In these circumstances, the receiving STA may simply determine that aggressive CCA is not allowed at S314, and not compare the power of the frame to a second aggressive CCA threshold at S318.

Such behavior may promote fairness in a system with legacy devices. If devices that support aggressive CCA activate aggressive CCA in an area in which legacy devices are present, the aggressive CCA values may cause the newer devices to dominate the wireless medium. Accordingly, treating legacy devices as indicating that aggressive CCA is not permitted may promote fairness between various STA.

As discussed above, a STA may indicate whether aggressive CCA is permitted through data encoded in a header. Thus, even when a frame is received at S308 from a STA that supports aggressive CCA, aggressive CCA may not be used unless the receiving STA determines that the aggressive CCA frame data indicates that aggressive CCA is permitted at S314.

In another embodiment, referring to FIG. 1, an AP 102 indicates in a frame transmitted to one or more of associated STAs 104, 106, 108 and 110 to set an aggressive CCA indication value to a specific state. In other words, an aggressive CCA instruction may be sent from an AP 102 to associated STAs.

When a STA that is associated with the AP 102 sends a frame, the STA sets the CCA indication value to the state that the AP has indicated, and adjust its own CCA threshold value accordingly. More specifically, the STA that receives an aggressive CCA instruction may apply an aggressive CCA threshold value at S318 when assessing the wireless medium. In addition, the STA may encode a frame that it transmits to indicate that aggressive CCA is permitted at S320.

In an embodiment, an AP 102 may indicate to enable or disable aggressive CCA in the management frames in a broadcasting or multicasting manner such that every STA receives the aggressive CCA indication. In addition, the AP 102 may selectively indicate whether aggressive CCA is permitted on a per-STA basis.

In other words, AP 102 may indicate that aggressive CCA is permitted for one or more STA 104 and 106, while the AP 102 may indicate that aggressive CCA is not permitted for remaining STA 108 and 110. Thus, in an embodiment, aggressive CCA may be selectively based on the situation of each individual STA.

In an embodiment, aggressive CCA thresholds may be implemented for STA even when frames are not encoded with an indication that aggressive CCA is permitted. In such an embodiment, a STA may apply the second aggressive CCA value at S318 when assessing a wireless medium, but not encode a transmitted frame at S320. In other words, in an embodiment, S320 may not be performed.

In another embodiment, when a STA sends a frame, the STA applies an MCS level for the frame that has a greater margin for a given radio environment when the STA receives an instruction to enable aggressive CCA compared to an MCS level that is applied when the STA determines that aggressive CCA is not to be applied.

In another embodiment, a number of frame transmission failures that occur during a predetermined time period and a predetermined zone is compared to a threshold value. The predetermined zone may be a physical area, a BSS, or some other logical grouping. When the number of transmission failures in the time period exceeds the predetermined value and the failed frames were sent under aggressive CCA conditions, a transmitting STA may set an aggressive CCA value in a frame to instruct receiving STA that aggressive CCA is not enabled. In addition, the transmitting STA may not apply aggressive CCA values when assessing the medium.

In another embodiment, when a first STA sends a frame that initiates a Network Allocation Vector (NAV), the first STA sets an aggressive CCA indication of the first frame to a state that disables aggressive CCA, and applies its own CCA threshold value accordingly.

In another embodiment, when a first STA receives a frame and the frame has valid Duration information that sets a NAV, the first STA sets or updates a NAV if the received sensitivity level of the frame is above the CCA threshold level that is indicated in the frame. For example, with respect to process 300, if the first threshold value of S312 is set to −82 dBm and the second threshold value of S318 is set to −62 dBm, and if the frame is received at −70 dBm, the first STA sets or updates the NAV if frame indicates at S314 that aggressive CCA is not allowed. However, the first STA may not set or update NAV if it determines at S314 that the indication of the frame is set to a state that enables aggressive CCA.

In another embodiment, when a first STA sets the aggressive CCA indication to a first state and sends multiple frames within a single transmission opportunity (TXOP), the STA uses the same state throughout the TXOP.

In another embodiment, when a first STA transmits a first frame in response to a second frame within a predetermined time period, wherein the indication of the second frame is set to a first state, the indication of the first frame is set to the same first state. In other words, when a STA sends back a response frame to a soliciting frame in a predetermined time, it uses the same indication value.

In another embodiment, when a first STA receives a frame and the indication of the first frame is set to a state that enables aggressive CCA, and the duration of the frame is a known first value, the first STA transmits a second frame based on an aggressive CCA threshold value. In this embodiment, the indication of the second frame is set to a state that enables aggressive CCA and the duration of the second frame is equal to or less than the first value.

In an embodiment, an instruction to implement aggressive CCA is expressed in a single bit in the PHY layer header part of a frame. In such an embodiment, the first state instructs a receiving STA to disable aggressive CCA, and the second state instructs the receiving STA to enable aggressive CCA.

In another embodiment, the indication resides in a HE-SIG-A field of a frame that follows an L-SIG field. In still another embodiment, the aggressive CCA indication may be included in the HE-SIG-B field.

In some situations, indicating that aggressive CCA is permitted by encoding a frame may reduce system performance. For example, when multiple STAs have frames to transmit, after aggressive CCA is indicated in a received frame, all STAs may assess the medium under aggressive CCA conditions, creating higher levels of interference for an OBSS. Therefore, in some embodiments, a STA, such as STA A, disables aggressive CCA in a frame that is about to transmit if the frame has a length/duration that is less than a predetermined threshold. Hence, other STAs, such as STA B, have to wait at least until the end of the frame sent by STA A and then attempt to access the medium according to the channel access rules. This rule makes sure short frames, which are less likely to recover from interference during their short duration, would not receive possible interference from another STA if the aggressive CCA were enabled. In some other embodiments, when a STA, such as STA A, enables the aggressive CCA in a frame that is about to transmit, other STAs, such as STA B, may attempt to access the medium according to the channel access rules (such as observing mandatory IFS periods and expiry of appropriate back-off timers) given that the frame that STA B is about to send fits the remaining time until the end of the ongoing frame sent by STA A.

Figure 4:
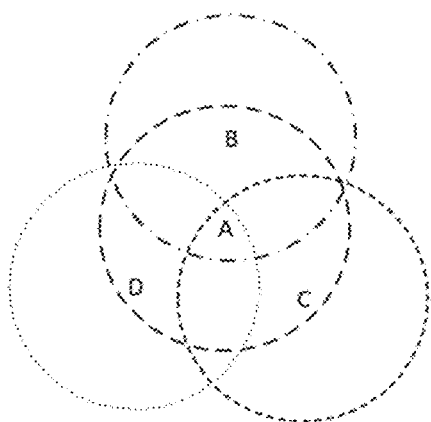
FIG. 4 illustrates overlapping coverage areas.

FIG. 4 shows a STA A, which is within coverage areas of three other STAs B, C and D. If STA A is the first node that transmits a frame with an indication that aggressive CCA is permitted, then surrounding STAs B, C and D may all assess the medium using aggressive CCA conditions, and include an indication that aggressive CCA is permitted in their frames. Thus for many consecutive frames, the aggressive CCA sequence (i.e. frames with aggressive CCA permitted) could continue.

In this situation, STA A and the recipient of its frame could experience substantial interference from STAs B, C and D, but each of those STAs would experience lower levels of interference. If all STAs in the scenario of FIG. 4 are transmitting according to an aggressive CCA, then STA A may have difficulty successfully transmitting frames. Thus, in an embodiment, a number of concurrent or consecutive frames that are permitted to use aggressive CCA may be limited.

Figure 5:
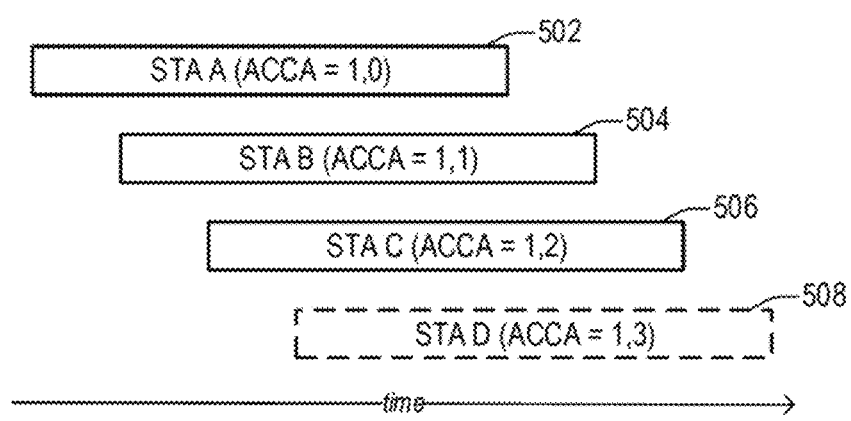
FIG. 5 illustrates a plurality of concurrent frames according to an embodiment.

FIG. 5 shows an embodiment of the frames transmitted by the STAs shown in FIG. 4 that include information limiting the number of transmissions that enable and/or use aggressive CCA. In an embodiment, a second field is included in frames that show the order of the frame in an aggressive CCA period, or similarly/equivalently it shows whether the transmission of the subsequent frame has been based on the allowance of aggressive CCA (or spatial reuse) from an earlier frame. In this embodiment, a counter, which indicates an order of the frame in the aggressive CCA period, is added to each frame so that the maximum number of concurrent transmissions is limited. Equivalently, such a counter plays the role of an indicator which indicates whether the transmission of the ongoing frame is based on the allowance of aggressive CCA from a first frame (i.e. a first frame that carries an aggressive CCA set to enabled), or whether the ongoing frame has accessed the medium based on legacy medium access rules (i.e. non-aggressive access rules).

Returning to the scenario of FIG. 4, when STA A starts a frame transmission with a value in a frame set to a state that enables aggressive CCA, it may also include a second field that shows the order of the frame in the aggressive CCA period. As shown in FIG. 5, frame 502 is the first frame transmitted by STA A in a sequence, so the order value in frame 502 is set to 0.

STA B receives frame 502 and performs process 300, setting the aggressive CCA indication in a transmitted frame to enabled at S320. Thus, frame 504 has a first value of 1, which indicates that aggressive CCA is permitted by receiving frames. In addition, STA B increments the sequence counter from 0 to 1 because it is the first STA to transmit a frame (504) after receiving the initiating frame 502.

In the embodiment of FIG. 5, the maximum number of concurrent transmissions that can occur after the initiating frame is set to two. Thus, when STA C receives frame 504 from STA B, it increments the sequence counter to 2, and transmits that data in frame 506. However, when STA D receives frame 506, in accordance with the rule that only two consecutive frames are permitted to use aggressive CCA, STA D does not transmit a frame 508 that indicates aggressive CCA is permitted. In addition, STA D may not use aggressive CCA when assessing a medium. In this way, the number of simultaneous transmissions that were assessed under aggressive CCA may be limited.

Multiple variations are possible in embodiments. The number of concurrent transmissions that are permitted may be different from two. In addition, the number of concurrent transmissions may be adjusted and set, for example, by an AP or by a STA according to current network conditions. This information may be included as a field in the PHY header of a PPDU, such as HE SIG-A.

In another embodiment, a STA may consider an amount of time that has passed since receiving a frame from another STA when determining whether to enable aggressive CCA, where longer times are associated with enabling aggressive CCA. For instance, a STA that receives a frame carrying the aggressive CCA indicator (and whose RA address does not carry the identification that the STA is identified with and is not a broadcast frame) assesses the medium as follows. If the duration of the frame (obtained from the L_LENGTH field) indicates that the frame is larger than a threshold then the STA assesses the availability of the medium using the RSSI of the received frame along with the content of the aggressive CCA indicator (ACCA) (and in some embodiments along with the Color field carried in the received frame). Otherwise, the STA assesses the availability of the medium according to the CCA legacy rules (based on the RSSI of the received frame).

In another embodiment, the state of aggressive CCA and the state of the order of the frame in the aggressive CCA period are combined together. One example is to use two bits for this information. For example, 00 may indicate that aggressive CCA is not allowed, 01 may indicate that aggressive CCA is allowed, and this frame is a first frame in a sequence, 10 may indicate that aggressive CCA is allowed, and this frame is a second frame in a sequence, and 11 may indicate that aggressive CCA is not allowed, and this frame is a third frame in a sequence. Using this example with respect to the embodiment of FIG. 5, the first frame 502 may be encoded with 01, the second frame 504 may be encoded with 10, and the third frame 506 may be encoded with 11.

With the described encoding method: (a) an unintended STA that receives the first frame 502 realizes that the transmitter of the first frame accessed the medium without using the aggressive CCA rule and that using aggressive CCA to access the medium during the reception of the first frame is allowed, (b) an unintended STA that receives the second frame 504 realizes that the transmitter of the second frame accessed the medium using the aggressive CCA rule and that using aggressive CCA to access the medium during the reception of the second frame is allowed, (c) an unintended STA that receives the third frame 506 realizes that the transmitter of the third frame accessed the medium using the aggressive CCA rule and that using aggressive CCA to access the medium during the reception of the third frame is not allowed (given that the sequence of frames using aggressive CCA is limited to two frames in this example). In another example, if the sequence of frames using aggressive CCA is limited to one then in above example there would not be a third frame (i.e. only frames 502 and 504 with the same encoding as described above would exist and the third frame 506 would not be allowed).

In an embodiment, the indication of aggressive CCA resides in HE-SIG-A field that follows a L-SIG field of a frame. Additional indications that could reside in a HE SIG-A or HE SIG-B field include: (1) an indication of the order of the frame that uses aggressive CCA after receiving another frame that has set aggressive CCA enabled, and (2) an indication of the maximum number of frames that can use aggressive CCA after receiving a frame that has set aggressive CCA as enabled.

Spatial Reuse Field

A spatial reuse (SR) field may be included in a HE SIG-A field of a HE PPDU. This disclosure describes various ways that a SR field may be encoded and transmitted in order to ensure system fairness, particularly for legacy devices, and to improve system efficiency.

Orthogonal Frequency Division Multiple Access (OFDMA) is a technique that may be used in wireless/Wi-Fi technology in order to enhance the aggregation of multiple payloads that are destined to multiple STAs within the same frame.

Figure 6:
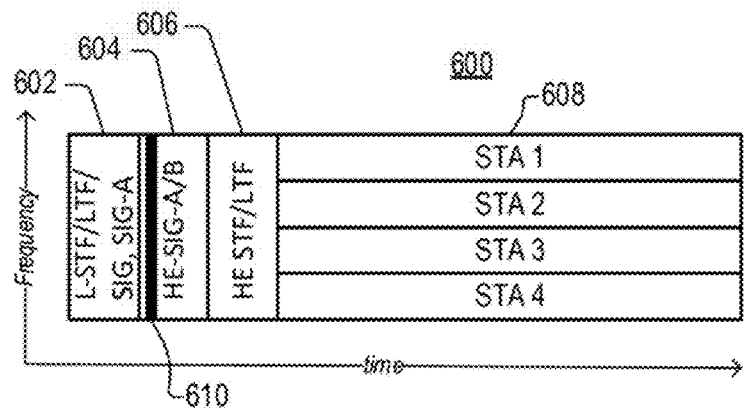
FIG. 6 illustrates an OFDMA frame structure.

FIG. 6 shows an example of a downlink (DL) OFDMA frame 600 that is transmitted to a set of STAs. The horizontal dimension is the time dimension, which corresponds to a number of OFDM symbols, and the vertical dimension is the frequency dimension, or number of tones or subcarriers. For a given Fast Fourier Transform (FFT) size, the number of tones is given. However, depending on the subcarrier spacing, two OFDM symbols with, for example, FFT=64 and FFT=256, could occupy the same bandwidth.

A sub-band may be a horizontal partition of an OFDMA PPDU or frame where a set of contiguous tones for a contiguous set of OFDM symbols are designated for a given payload whose expected destination may be a STA or a set of STAs. In the example shown in FIG. 6, the bandwidth of individual sub-bands are the same due to the size of the payload sent to each STA. However, FIG. 6 is merely an example of an OFDMA frame.

The bandwidth assigned to payloads of STAs may depend on the payload size, the MCS, number of spatial streams that an AP determines for the sub-band transmission, and overall considerations that the AP may make to align the length/duration of various PHY Service Data Unit (PSDU) sub-bands. Each OFDMA frame 600 has a plurality of fields that may use various symbols.

A header may include Legacy (L-) Short Training Field (STF), Long Training Field (LTF) and Signal (SIG) fields 602, which are several symbols based on legacy 802.11 specifications. The presence of these symbols would make any new design compatible with legacy designs and products. The legacy STF, LTF and SIG symbols are modulated/carried with FFT size of 64 on 20 MHz sub-channel and duplicated every 20 MHz if the DL OFDMA PPDU has a bandwidth wider than 20 MHz.

HE SIG-A and SIG-B fields 604 are several symbols that carry information regarding each PSDU 608 and with respect to the RF, PHY and MAC properties of the PPDU 600. This disclosure provides embodiments in which fields are located either in HE SIG-A and/or HE SIG-B fields 604. In an embodiment, HE SIG-A and HE SIG-B symbols can be carried or modulated using FFT size of 64 or 256. A HE SIG-B field may not be present in all DL OFDM PPDUs or uplink (UL) OFDMA PPDUs.

HE STF/LTF symbols 606 are used to perform RF and PHY processing for each PSDU 608 and/or for the whole PPDU 600. Depending on whether HE STF/LTF symbols are beamformed or not, there might be two sets of such symbols 606.

Each DL PSDU 608 contains the payload that is destined to a STA in addition to MAC padding and PHY padding. Broadcast PSDU(s), located in a full-band PSDU region 608, are destined to all STAs that are associated with the AP. The presence and length of such PSDU(s) are indicated in HE SIG-A and/or SIG-B fields 604.

The unicast PSDU(s), which is located in the sub-band region, are destined to STAs that are associated with the AP or about to associated with the AP. The presence and length of a PSDU 608 in a sub-band or set of sub-bands and the one or more STA that receive of the unicast PSDUs 608 are indicated in HE SIG-A and/or SIG-B fields 604. In an embodiment, one or more unicast PSDUs may be located in the sub-band PSDU region 608.

The HE SIG-A field may include a Spatial Reuse (SR) field 610. The SR field 610 may include, for example, an indication of a CCA level, an interference level that is accepted, and a transmit power of a particular device.

Figure 7:
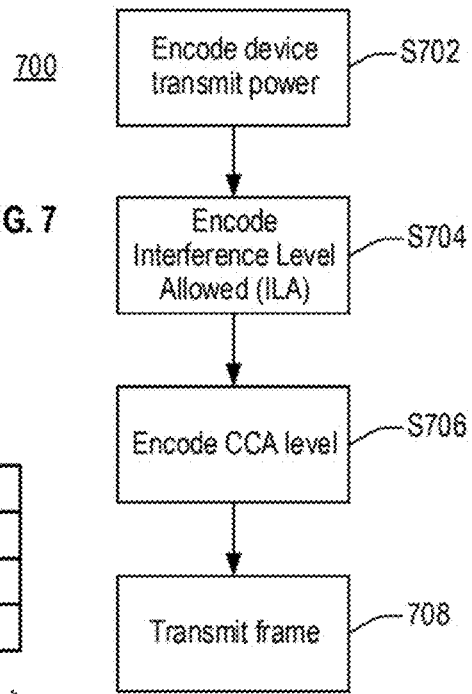
FIG. 7 illustrates a process of encoding a spatial reuse field according to an embodiment.

FIG. 7 shows a process 700 of encoding a SR field. In an embodiment, process 700 includes encoding a transmit power (TP) of a transmitting device at S702. The TP of the transmitting device may be a default or standard power level of the device that transmits the frame, as opposed to an actual measured transmit power. In another embodiment, an actual transmit power may be encoded in the SR field.

Transmit power information may be useful for receiving STAs to refine their CCA thresholds. Different STAs and APs may have different transmit powers. For example, an APs' TP could be 20 dBm and a STA's TP could be 17 dBm. In addition, transmit power may vary between individual STAs and APs.

When there is a substantial disparity between transmit powers of an AP and a STA, and in particular when an AP's TP is higher than a STA's TP, a STA on the border of an AP coverage may back off for the AP, while the AP receives the STA's signal below a CCA level e.g. −82 dBm, hence not deferring. In other words, unequal transmit powers may lead to unfairness.

For example, consider the situation where a first CCA threshold is −82 dBm, a STA has a TP of 17 dBm, an Overlapping BSS (OBSS) AP has a TP of 20 dBm, and where the STA receives the AP's signal at −80 dBm. Due to reciprocity, the path loss between the STA and the AP is the same in both directions, but due to the lower TP of the STA, the AP receives the STA's signal at −83 dBm.

As a result, the AP ignores reception of the STA's signal, so that the medium is assessed as IDLE despite presence of the STA's frame. This causes unfairness in terms of competition to access the medium between the STA and the AP.

Since legacy frames do not include an indication of the TP in a PPDU, there is no mechanism in legacy fields for receiving STA to consider a possible TP imbalance between a receiving STA and a transmitting STA to avoid possible channel access unfairness. However, by including transmit power in HE SIG-A symbols, it is possible to improve the CCA procedure and prevent such unfairness.

In an embodiment, a STA that receives a frame with a legacy CCA threshold may refine the medium access availability considering the RSSI of the received frame and the difference between its own TP and the TP indicated in the SIG-A of the received frame.

In an embodiment, a STA with a larger TP may consider a more sensitive CCA threshold value compared to CCA values of −82/−79/−76 dBm (i.e., the legacy CCA thresholds for 20 MHz, 40 MHz and 80 MHz received bandwidth respectively) while receiving a HE frame. In one embodiment, if a STA with a transmit power TP1 receives an HE frame with SR field indicating a transmit power of TP2, where TP1=TP2+X dB and X>0, the STA reduces its CCA thresholds by X dB. With respect to default values, the CCA thresholds would be CCA=−82-X dBm, −79-X dBm, or −76-X dBm (for 20 MHz, 40 MHz and 80 MHz received bandwidth respectively) instead of CCA=−82/−79/−76 dBm. In one embodiment, if a STA with TP1 receives an HE frame with a SR field indicating TP2, where TP1=TP2+X dB and X>0, the STA should reduce its CCA thresholds by X dB, where X is the difference in TP values.

A STA with a smaller TP may consider a less sensitive CCA instead of a default CCA=−82/−79/−76 (i.e. the legacy CCA thresholds for 20 MHz, 40 MHz and 80 MHz received bandwidth respectively) while receiving a HE frame. In one embodiment, if a STA with TP1 receives an HE frame with SR field indicating TP2, where TP2=TP1+X dB and X>0, the STA may increase CCA by X dB. With respect to default CCA thresholds, the CCA would be −82+X dBm, −79+X dBm, or −76+X dBm instead of −82/−79/−76 dBm (for 20 MHz, 40 MHz and 80 MHz received bandwidth respectively).

One example of SR information in a physical layer header is Color field of a frame. A Color field identifies a BSS to which a transmitter of the frame belongs. So, if a STA identifies a start of a frame while assessing a wireless medium, the STA may check the Color field of the frame.

In some embodiments, a HE STA that receives a HE PPDU that carries SR field with TP content in the HE SIG-A and a Color field in HE SIG-A, may apply a different CCA threshold to evaluate the availability of the medium considering the Color field and a TP difference. Specifically, a receiving STA may consider whether the Color field in the received frame is the same as any of the Color fields that the STA is associated with, and the difference between the TP of the transmitter of the frame and the TP of the receiving device.

A STA may use the Color field in its evaluation of the availability of the medium and CCA rules. In an embodiment, if the Color field information is the same as the Color of the receiving STA (or any of the Color values that the receiving STA is identified or associated with), the STA assesses the wireless medium as BUSY. However, if the Color field information is different from the Color of the receiving STA (or any of the Color values that the receiving STA is identified or associated with), the STA may compare the received signal strength with a threshold value (e.g, OBSS_PD), and assesses the wireless medium as BUSY only if the received signal strength is above the threshold value. In other words, a STA may preferentially assess the wireless medium as BUSY when a frame is received from the same BSS to which the STA belongs compared to a frame from a different BSS.

However, as Color subfield is separately included in the physical layer header part, the SR field does not necessarily imply Color subfield information.

In an embodiment in which a HE STA with a transmit power TP1 that receives a HE PPDU that carries SR field with a TP field indicating a power of TP2 and a Color field in a HE SIG-A field, where TP1=TP2+X dB and X>0, the STA reduces its CCA thresholds by X dB if the Color field in the received frame is equal to one of the Color values that the receiving STA is associated or identified with. Specifically, the CCA thresholds would be −82−X dBm, −79−X dBm, or −76−X dBm instead of −82/−79/−76 dBm (for 20 MHz, 40 MHz and 80 MHz received bandwidth respectively).

In an embodiment in which a HE STA with a transmit power TP1 that receives a HE PPDU that carries SR field with a TP field indicating a power of TP2 and a Color field in a HE SIG-A field, where TP1=TP2+X dB and X>0, the STA may reduce its CCA thresholds by X dB if the Color field in the received frame is different from any of the Color values that the receiving STA is associated with.

In an embodiment in which a HE STA with a transmit power TP1 that receives a HE PPDU that carries SR field with a TP field indicating a power of TP2 and a Color field in a HE SIG-A field, where TP1=TP2-X dB and X>0, the STA may increase its CCA thresholds by X dB if the Color field in the received frame is equal to one of the Color values that the receiving STA is associated with. Specifically, the CCA thresholds would be CCA=−82+X dBm, −79+X dBm, or −76+X dBm instead of CCA=−82/−79/−76 dBm (for 20 MHz, 40 MHz and 80 MHz received bandwidth respectively).

In an embodiment in which a HE STA with a transmit power TP1 that receives a HE PPDU that carries SR field with a TP field indicating a power of TP2 and a Color field in a HE SIG-A field, where TP1=TP2-X dB and X>0, the STA may increase its CCA thresholds by X dB if the Color field in the received frame is different with any of the Color values that the receiving STA is associated with.

In the set of TP and Color rules described above, a HE STA may determine the availability of the wireless medium or may revise the status of the availability of the wireless medium after receiving a HE SIG-A field. In legacy systems, the availability of the wireless medium may be decided after receiving STF/LTF symbols in the legacy portion of the PHY header.

In an embodiment, a HE STA may determine the status of the medium to be IDLE or BUSY after receiving the legacy portion of the frame. However, a STA may revise the medium status after receiving a HE SIG-A part of the frame that carries SR and Color fields.

In another embodiment, a HE STA that receives a HE PPDU may determine that the medium is BUSY regardless of the RSSI of the received frame until it has processed and successfully decoded the HE SIG-A portion of the frame. Afterwards, the HE STA may determine whether the medium is BUSY or IDLE based on one or more of: (a) the RSSI of the received frame, (b) the difference in the TP of the STA and the TP indicated in the SR field of the SIG-A of the received frame, and (c) whether the Color field carried in the HE SIG-A of the received frame is equal to any of the Color values that the STA is associated with.

Returning to FIG. 7, a process 700 of encoding a SR field may include encoding an indication of an allowed interference level (e.g., ILA) at S704. For example, consider a scenario in which a first STA A sends a HE PPDU to a second STAB, and a third STA C is an unintended recipient that receives the frame.

In one embodiment, the ILA subfield indicates the interference level allowed at transmitting STA A, since STA A may be expecting response frames from STA B. In such an embodiment, STA C may use such information to decide whether to perform SR, for example by assuming the medium is available despite receiving the frame, or to assume the medium is BUSY.

In another embodiment, the ILA subfield in frame that is sent by STA A indicates the level of interference that intended recipient STA B can tolerate. This is possible, for example after STA A has received ILA content from STA B in an a priori response frame.

A CCA level may be encoded at S706. One possible implementation for the CCA sub-field in a HE SIG-A field is that each STA indicates the CCA level (that it uses or it has used to evaluate the medium availability in the immediate past) in the CCA subfield of the SR field of HE SIG-A of the outgoing frame. For instance, if a STA uses a CCA threshold of −79 dBm in a process 300 of assessing the medium, then it would indicate that CCA level of −79 dBm in the SR field of the HE SIG-A of the HE frame it sends.

In some embodiments, if a STA uses a CCA of −82/−79/−76 dBm (legacy CCA thresholds for 20 MHz, 40 MHz, and 80 MHz frames, respectively) to evaluate the availability of the medium, the STA may not report the CCA threshold since these CCA thresholds are the default values. Thus, in an embodiment, the lack of a CCA subfield in a SR field is interpreted as the STA using default CCA values.

However, in another embodiment, a HE STA may report default CCA thresholds in a CCA subfield of a SR field of HE SIG-A.

In some embodiments, if a STA uses a CCA threshold value larger than −82/−79/−76 dBm to evaluate the availability of the medium, the STA reports the CCA threshold value. The adapted CCA threshold information may be used by other STAs to refine their own CCA thresholds. In particular, if a HE STA uses a CCA value other than the default values and indicates such CCA threshold in a frame that is about to transmit, the neighboring STAs may benefit from knowing the CCA value to adjust their own CCA values accordingly during the reception of the frame.

A SR part of a HE SIG-A field has a limited number of bits. Thus, even though process 700 shows several indications being encoded in an SR field, some embodiments may only use a portion of those indications. For example, in one embodiment, only one of S702 and S706 is performed. In other words, in an embodiment, the SR field may carry one or the other of CCA or TP data. Other variations are possible.

In a specific example, the SR may include an indication subfield and a value subfield, where the indication subfield indicates what type of content appears in the value subfield. In one example, the SR values are [(indication, 1 bit), (value, X bits)], where if the value is 0 then the value carries TP and if the value is 1 then the value carries CCA, e.g. (0,TP) or (1,CCA). In another example, the indication has 2 bits where the SR values are [(indication, 2 bits), (value, X bits)]. In an embodiment, TP, CCA, ILA etc. can be carried in the value subfield, e.g. (00,TP), (10,CCA), (01,ILA), (11,SRTBD) where ILA is the interference level allowed and in the SRTBD other relevant SR contents may be present.

In another embodiment, a few bits are assigned to each of the SR contents (CCA, TP, and ILA etc), so that SR field contents are TP (X bits), CCA (Y bits), ILA (Z bits), and X, Y and Z may be 1-3 bits each. In such embodiment, each value for the TP would be equivalent to a transmit power or a range of transmit power, and each value for the CCA would indicate a specific CCA value (or a range of values) or it would indicate a difference from reference CCA value (or a range of values).

In another embodiment a CCA level and TP are indicated jointly in the SR field of SIG-A. In such an embodiment, CCA and TP may be represented relative to their default or reference values or by an absolute indication.

In one embodiment of relative joint indication of CCA and TP, a table indicates TP and CCA thresholds relative to default CCA and TP values. Each entry of such table would indicate a level of deviation between the STAs actual CCA and TP values and the default CCA and TP values.

In such an embodiment, each row of a table indicates that the STA operates with X dB less power compared to a default or reference TP and operates with Y dB increase to a default or legacy CCA threshold. Specifically, the default CCA thresholds may be −82/−79/−76 dBm for 20/40/80 MHz bandwidths respectively.

In an embodiment, a limited range of X and Y values are covered so that a few bits are used to express all the entries in such a table. An example of such table could be: (TP, CCA) represented by 000, where TP is a reference transmit power known to all STAs (e.g. 20 dBm) and CCA is a reference CCA threshold for a reference bandwidth such as −82 dBm for 20 MHz bandwidth. With such reference, an example of encoding is as follows: (TP-3, CCA) represented by 001, (TP, CCA-3) represented by 010, (TP-3, CCA-3) represented by 011, (TP-6, CCA-3) represented by 100, (TP-3, CCA-6) represented by 101, (TP-6, CCA-6) represented by 110, etc. In this example the unit for CCA and TP is dBm and the unit of increase or decrease in CCA and TP values is dB, e.g. (TP-3, CCA-3) indicates TP (in unit of dBm) −3 dB and CCA (in unit of dBm) −3 dB. In the above example, values of 3 dB and 6 dB are used for X and Y, but in other embodiments, other values for X and Y can be used, such finer granularity of 1 dB or 2 dB (instead of 3 dB in above).

In one embodiment of joint indication of CCA and TP values, a table indicates TP and CCA values, and values are presented in both relative and absolute terms. In the table, a CCA value is relative to the default value and a TP value is an absolute or reference value or range of values. Each entry of such a table may indicate how much a STA's CCA value deviates from a default CCA value, as well as the absolute value or range of values for CCA.

In an embodiment, each row of the table indicates that the STA operates with X dBm TP and operates with Y dB increase in its CCA threshold (compared to the default values −82/−79/−76 dBm for 20/40/80 MHz). An example of such table is: (TP<17 dBm, CCA) represented by 000, (TP<17 dBm, CCA-3 dB) represented by 001, (TP=17 dBm, CCA) represented by 010, (TP=17 dBm, CCA-3 dB) represented by 011, (TP=20 dBm, CCA) represented by 100, (TP=20 dBm, CCA-3 dB) represented by 101, (TP=20 dBm, CCA-6 dB) represented by 110, etc. This in essence is quantizing a two-dimensional region of CCA-axis and TP-axis (where CCA is in reference to a CCA threshold for a reference bandwidth, such as −82 dBm for 20 MHz, and TP is in reference to a reference transmit power such as 20 dBm) where each non-overlapping bin/region of CCA and TP is encoded by a sequence of bits and a device, e.g. an AP, communicates the encoding to all other devices within its vicinity. In some embodiments, the above encoding scheme indicates the TP and CCA that the sender of the frame (that carries the encoding) operates based on. In other embodiments, the above encoding scheme indicates the TP and CCA that the sender of the frame requests other STAs to operate using the indicated CCA and TP values, e.g. an AP requests its associated STAs to use the indicated CCA and TP while attempting to access the medium.

The transmit power that a STA or AP uses may be regulated in some jurisdictions. For instance, in one regulatory jurisdiction the maximum allowed TP for a STA or AP might be TP1 while in another regulatory jurisdiction the maximum allowed TP for a STA or AP might be TP2. Due to such restrictions, in some embodiments where a relative or absolute indication for TP is used, the relative or absolute TP value may be defined relative to the maximum allowed TP of the jurisdiction in which the STAs or APs reside. In an embodiment, a STA or AP that operates in a regulatory jurisdiction is aware of the applicable regulatory restriction on the transmit power and would translate the relative or absolute TP indications (such as in above embodiments) with reference to the maximum TP (or other regulatory parameters) that is allowed in the regulatory jurisdiction in which they reside.

Figure 8:
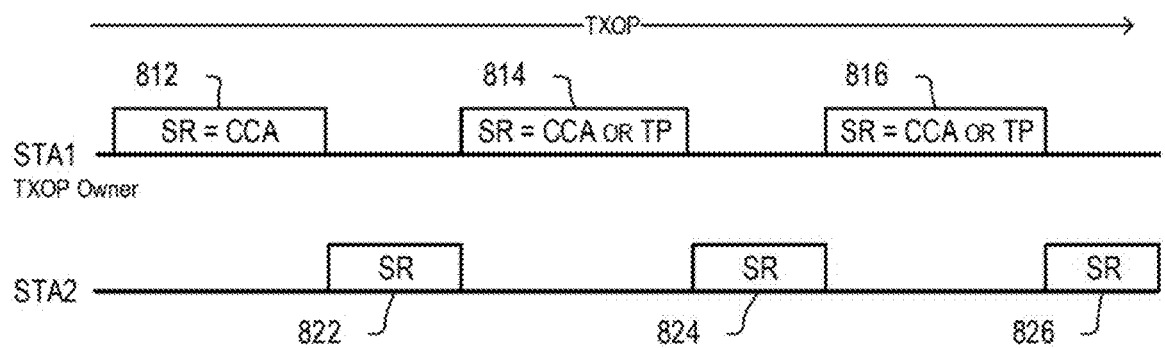
FIG. 8 illustrates STA transmissions in a TXOP according to an embodiment.

FIG. 8 shows an embodiment in which a first HE STA1 and a second HE STA2 are communicating during a TXOP. In the embodiment of FIG. 8, a SR field of a HE PPDU may carry either one of a TP value or a CCA value, but not both. In FIG. 8, first STA initiates the TXOP and is the TXOP owner. Meanwhile, second STA responds to the PPDUs 812, 814 and 816 of the first STA with block acknowledgments (BAs) in frames 822, 824 and 826, respectively.

The first STA sets the SR field in the first frame 812, which initiates the TXOP, to indicate a CCA value. In another embodiment, if the STA uses default CCA values, the first STA may set the SR field in the first frame 812 to indicate a TP value. For the subsequent frames in the TXOP, the first STA may set the SR field to CCA indication or TP indication. Thus, in the embodiment of FIG. 8, a CCA value is always included in the first PPDU 812 of a TXOP, while remaining PPDUs of the same TXOP may include a CCA value or a TP value.

In an embodiment, the unintended STAs that receive two or more HE PPDUs from the TXOP-owner may gather the CCA and TP values from the TXOP-owner in order to better perform SR given these two or more values. The SR values may include one or more of CCA, TP and ILA values. That is, STAs other than intended recipient STA2 may use information in the SR fields of PPDUS 812, 814 and 816 to improve network performance.

Meanwhile, a receiving STA does not perform CCA before transmitting ACK frames such as block ACK frames (BA) in response to the PPDUs. Accordingly, the second STA does not have a CCA value to report for the TXOP. However, as indicated in frames 822, 824 and 826, the STA may transmit SR data in response frames.

In such an embodiment, the second STA may include a TP value or an ILA value in the SR field of one or more response frame. If the STA indicates its TP, other STAs may use that information to more accurately measure how much interference affects the STAs. Thus, in an embodiment, the second STA may set the SR field in the response frames to indicate TP.

After one or more of a TP value, an ILA value and a CCA value is encoded, a frame that includes an SR field is transmitted at S708. Each of the values that are included in the SR field may be used when assessing whether a channel is clear and/or clear channel assessment parameters (e.g., one or more CCA thresholds, TP of the transmitting STA, etc.).

Spatial Reuse Fields within the Same TXOP

The SR field is related with CCA threshold adjustment of a STA when the STA assesses a wireless medium. Therefore, the SR field value is determined when a STA assesses a wireless medium.

There are several situations in which a STA transmits frames without performing channel assessment. One such situation is illustrated in FIG. 9.

Figure 9:
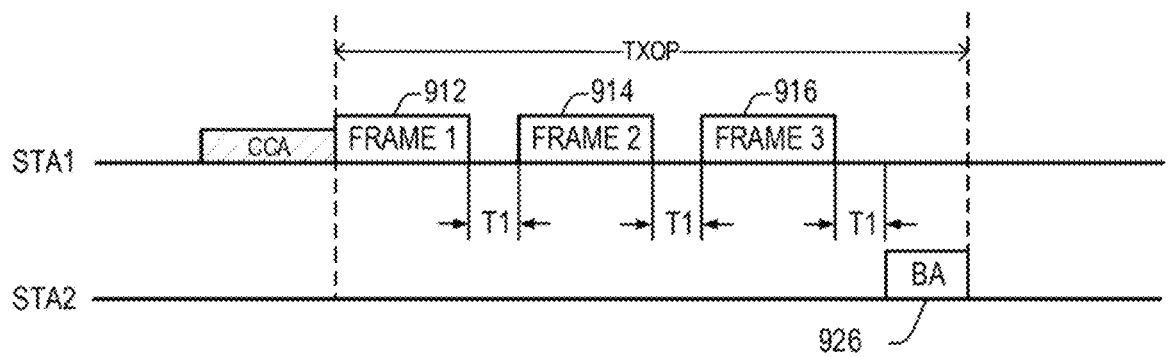
FIG. 9 illustrates STA transmissions in a TXOP according to an embodiment.

In the example of FIG. 9, STA1 has frames to send to STA2, and thus, STA1 performs channel assessment. After STA1 assesses the wireless medium as IDLE during a CCA evaluation, STA1 transmits a first frame 912 to STA2, and the first frame sets a TXOP for a duration of T_TXOP. After the TXOP duration is set, STA1 can transmit multiple frames in the same TXOP if there is more than one frame pending.

If the transmit queue of STA1 includes additional frames 914 and 916 and the duration of transmission of those frames plus the duration of any expected acknowledgement frame (e.g., BA) is less than the remaining TXOP duration, then STA1 may transmit the additional frames a predetermined time (T1) after the completion of the immediately preceding frame without repeating channel assessment.

Therefore, before transmitting second frame 914 and third frame 916, STA1 may not need to perform CCA. Moreover, after STA1 completes its own frame transmissions, STA1 may solicit an acknowledgement frame (BA) 926 from STA2. In this case, STA2 may transmit the acknowledgement frame 926 a predetermined time (T1) after receiving soliciting frame 916 without performing channel assessment.

Therefore, while STA1 is aware of the CCA performed prior to transmitting frame 912, STA1 does not have CCA information for CCAs performed for subsequent frames 914 and 916. Similarly, STA2 does not perform CCA before transmitting BA frame 926, so STA2 does not have CCA data for that transmission.

Therefore, in terms of indicating a SR field in the physical layer header of each frame, which is related with CCA threshold adjustment of STA1/2 when the STAs assesse the wireless medium, STA1 can figure out the SR field for first frame 912 because STA1 performs CCA (channel assessment) right before first frame 912. However, STA1 does not have a correct/accurate SR field value for frames 914 and 916 because STA1 transmits frames 914 and 916 without performing CCA. Similarly, STA2 does not have a correct/accurate SR field value for BA frame because STA2 transmits BA without performing CCA.

Described herein are several embodiments that are directed to populating data in an SR field of frames that are not directly associated with an immediately preceding CCA procedure. In an embodiment, when a STA transmits a frame without performing CCA within a TXOP, the contents of the SR field in the physical layer header of the frame are determined based on the most recent CCA threshold status within the TXOP. In another embodiment, a default value may be used for the SR field.

Multiple embodiments of determining contents of an SR field are possible, and particular embodiments may be more appropriate for specific situations.

In an embodiment, when a STA transmits an HE frame without performing CCA within a TXOP, the SR field of the HE frame may be based on the most recent CCA threshold status within the TXOP.

In an embodiment, all HE frames transmitted by a STA within the same TXOP have the same SR field value until the STA performs another CCA.

In an embodiment, if a STA transmits an HE frame as a response frame without performing CCA within a TXOP, the SR field of the HE frame may be based on the most recently received SR field within the TXOP. In particular, the SR field of the frame to be transmitted may be set to the SR field of the frame most recently received from a STA in the same BSS, or the STA with which communication is occurring in the TXOP (i.e., the TXOP holder).

In an embodiment, if no SR field was received prior to transmitting a HE frame as a response frame within the TXOP, the STA uses a default value for the SR field.

In an embodiment, if a STA transmits an HE frame as a response frame without performing CCA within a TXOP, the SR field of the HE frame is based on the most recent CCA threshold status performed by the STA.

In an embodiment, when a STA transmits an HE frame without performing CCA, the SR field of the HE frame is set to a predetermined value. The predetermined value may be a state that implies no change in CCA threshold values.

Figure 10:
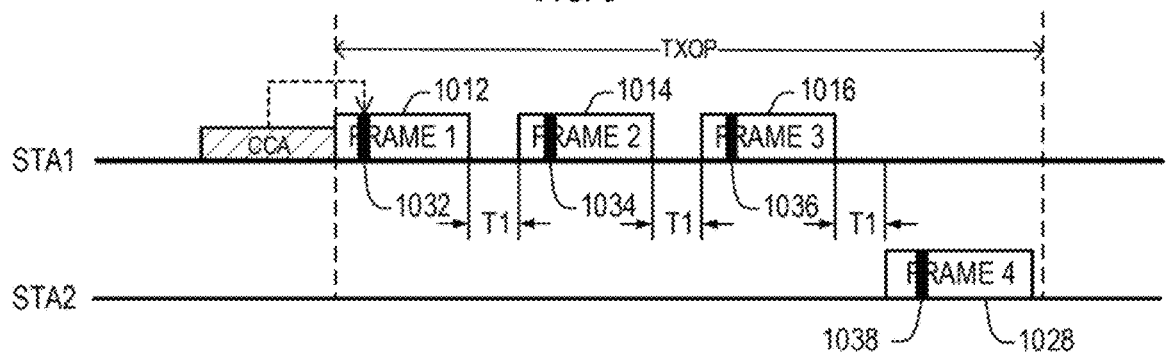
FIG. 10 illustrates STA transmissions in a TXOP according to an embodiment.

FIG. 10 illustrates an embodiment of determining the contents of an SR field within the same TXOP. In FIG. 10, STA1 has multiple frames buffered to send. To initiate the transmission, STA1 performs CCA. After STA1 assesses the wireless medium as IDLE during the CCA, STA1 transmits a first frame 1012 to STA2, and the first frame 1012 sets a TXOP duration of T_TXOP.

At a predetermined time T1 after transmitting first frame 1012, STA1 transmits a second frame 1014 without performing CCA because transmission of the second frame 1014 can be finished within TXOP duration. In this example, both first frame 1012 and second frame 1014 use a frame format that includes SR fields 1032 and 1034, respectively, in the physical layer header part of the frames.

The SR field of first frame 1012 is determined based on CCA threshold adjustment during the channel assessment. In an embodiment, the SR field 1034 of second frame 1014 is also determined based on the same initial CCA. In one embodiment, the SR field 1012 of first frame 1012 is identical to the SR field 1034 of second frame 1014 and SR field 1036 of third frame 1016. STA1 may use the same CCA values for all SR fields in the same TXOP.

In another embodiment, the SR field 1034 of second frame 1014 is function of the value of SR field 1032 of first frame 1012. In such an embodiment, additional parameters can be considered when determining subsequent SR fields 1034 and 1036. One additional parameter that may be considered is the transmission bandwidth difference between first frame 1012 and second frame 1014.

For example, if STA1 assesses a wireless medium to be IDLE by increasing a CCA threshold value for an OBSS frame, which is accompanied by a reduction of STA1's transmission power, wherein the transmission power reduction is indicated in the SR field of first frame 1012, the transmission power reduction indicated in the SR field of second frame 1014 shall not be lower than the transmission power reduction indicated in the SR field of first frame 1012.

In another example, if the CCA level during the initial CCA is indicated in the SR field 1032 of first frame 1012, the same CCA level is indicated in the SR field 1034 of second frame 1014, as well as the SR field 1036 of third frame 1016.

Or, if interference level accepted (ILA) during the CCA is indicated in the SR field 1032 of first frame 1012, the same interference level accepted is indicated in the SR field 1034 of second frame 1014, as well as the SR field 1036 of third frame 1016.

In addition, FIG. 10 shows a fourth frame 1028 transmitted by STA2 that includes an SR field 1038. Like SR fields 1032, 1034 and 1036, SR field 1038 may be based on the CCA performed by STA1 immediately prior to the TXOP. SR field 1038 may be the same as all of the SR fields in a TXOP, or may have values that are adjusted based on additional parameters.

In an embodiment, T1 of FIG. 10 is a short underframe space (SIFS).

Figure 11A:
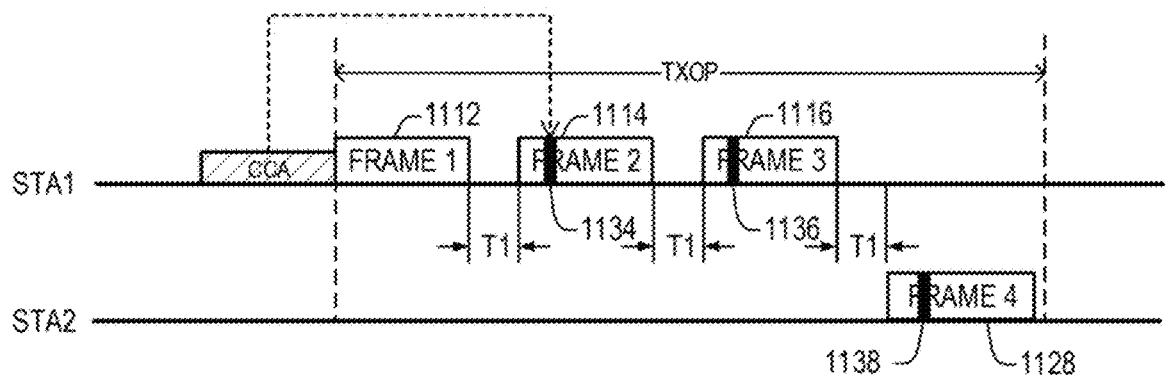
FIG. 11A illustrates STA transmissions in a TXOP according to an embodiment.

FIG. 11A shows another embodiment of determining an SR field for frames in the same TXOP. In FIG. 11A, first frame 1112 follows a frame format that does not have an SR field in the physical layer header part of the frame, such as a non-HT frame format. However, second frame 1114 follows a frame format that has SR field in the physical layer header part of the frame, such as HE frame format defined in IEEE 802.11 Task Group ax.

In one embodiment, the SR field of second frame 1114 is determined based on CCA threshold adjustment during the initial CCA, and may simply reflect the CCA threshold used for the CCA. In another embodiment, the SR field of second frame 1134 is a function of the CCA threshold adjustment performed in the initial CCA and a transmission parameter difference between a transmission parameter of first frame 1112 and second frame 1114. The transmission parameter may be a bandwidth value.

For example, if STA1 assesses a wireless medium to be IDLE by increasing a CCA threshold for OBSS frame, which is accompanied by reduction in the STA's transmission power, the transmission power reduction indicated in the SR field of second frame 1014 shall not be lower than that used during CCA.

In another example, if STA1 assesses a wireless medium to be IDLE by increasing CCA threshold for OBSS frame, which is accompanied by reduction in the transmission power, the transmission power reduction indicated in the SR field of second frame 1014 is the same with that used during CCA.

In addition, FIG. 11A shows a fourth frame 1128 transmitted by STA2 that includes an SR field 1138. Like SR fields 1134 and 1136, the contents of SR field 1138 may be based on the CCA performed by STA1 immediately prior to the TXOP. SR field 1138 may be the same as all of the SR fields in the TXOP, or may include values that are adjusted based on additional parameters. SR field 1138 may be present in fourth frame 1128 so long as the format of fourth frame 1128 supports the SR field and receives a frame from STA1 that does include an SR field, regardless of whether first frame 1112 has a format that supports SR fields.

Figure 11B:
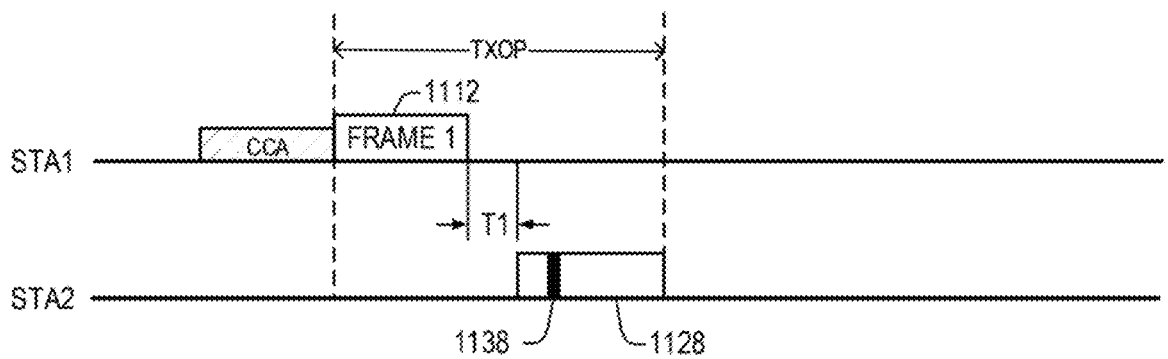
FIG. 11B illustrates STA transmissions in a TXOP according to an embodiment.

FIG. 11B shows another embodiment of determining an SR field for frames in the same TXOP. In FIG. 11A, first frame 1112 uses a frame format that does not have an SR field in the physical layer header part of the frame, such as a non-HT frame format.

In FIG. 11B, STA1 has a frame buffered to send to STA2. To initiate the transmission, STA1 performs CCA. After STA1 assesses the wireless medium as IDLE during CCA, STA1 transmits the first frame 1112 to STA2, wherein first frame 1112 sets a TXOP duration.

In a predetermined time (T1) after transmitting the first frame 1112, STA2 transmits a response frame 1128 to STA1. In this example, first frame 1112 uses a frame format that does not have an SR field in the physical layer header part of the frame, such as non-HT frame format. However, response frame 1138 uses a frame format that has SR subfield in the physical layer header part of the frame, such as HE frame format defined in IEEE 802.11 Task Group ax.

In one embodiment, the SR subfield of response frame 1128 is set to a predetermined value. In another embodiment, the predetermined value is a state that implies no CCA threshold adjustment is made. In another embodiment, the predetermined value is broadcasted by a serving AP before transmitting response frame 1128.

In another embodiment, the predetermined value is determined when STA2 is associated to the serving AP. In another embodiment, the serving AP periodically broadcasts the predetermined value in a Beacon frame. In another embodiment, STA2 decides the SR field 1138 of second frame 1128 based on the most recently used CCA threshold adjustment value. In another embodiment, STA2 decides the SR field of response frame 1128 based on based on the SR field of a frame from STA1 that is the most recently successfully received frame that comprises the SR information.

Spatial Reuse Fields in Multiuser Transmissions

In order to support higher throughput, some wireless communication systems use multi-user (MU) simultaneous transmission and reception. Examples of MU technologies include OFDMA and Multi-User Multiple-Input-Multiple-Output (MU-MIMO).

Figure 12:
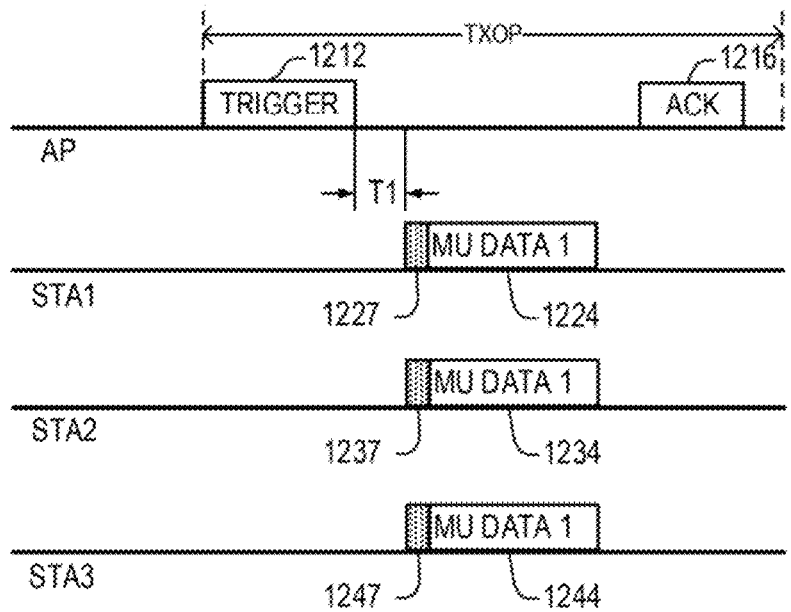
FIG. 12 illustrates MU transmissions in a TXOP according to an embodiment.

FIG. 12 shows an example of an uplink MU transmission. In the example of FIG. 12, the AP performs CCA, establishes a TXOP, and multicasts a trigger frame 1212 to STA1, STA2, and STA3 in the AP's BSS. After a predetermined time T1, the STAs transmit their own uplink MU frames 1224, 1234 and 1244.

Because all the participating STAs received the trigger frame 1212 almost simultaneously and all three STAs used the same delay (T1), the transmission time of all three STAs can be synchronized, and therefore STA transmissions 1224,

1234 and 1244 are synchronized as well. The AP may then transmit an ACK frame 1216.

The UL frames from the participating STAs may include preambles that extend across the same part of the frequency spectrum as all other STAs. Returning to the example of FIG. 6, even though data transmissions 608 of the transmitting STAs are separated in frequency, the preamble parts 602, 604 and 606 share the same frequencies.

Therefore, in order to avoid interference, the STA may all transmit the same preamble information at the same time. Accordingly, in FIG. 12, the data in preambles 1227, 1237 and 1247 is the same. The information for SR in the physical layer header may be included in the HE-SIG-A field so that other STAs may use the HE-SIG-A field to perform channel assessment.

Therefore, in an embodiment, all participating STAs of an UL MU transmission apply the same SR related adjustment, such that SR related fields in the physical layer header part from different STAs are the same among participating STAs. In an embodiment, all participating STAs of an UL MU transmission apply the same SR value to the SR field such that the indicated value disallows other unintended recipients of the UL MU frame to attempt to access the medium using aggressive CCA or spatial reuse techniques. In other words, the value indicates that the unintended recipients shall use legacy CCA thresholds and legacy channel access rules to access the medium during the UL MU transmission.

In an embodiment, when a STA assess the wireless medium for an UL MU transmission, the STA uses an OBSS PD value without any adjustment. In other words, the STA may use a default or default OBSS PD value for a CCA part of an SR field.

In an embodiment, when an AP schedules an UL MU transmission, the AP assigns an MCS level with same level of interference margin for all scheduled STAs.

In an embodiment, all scheduled STAs use the same level of transmission power reduction for an UL MU transmission.

In an embodiment, all scheduled STAs for an UL MU transmission use the same level of OBSS PD threshold value adjustment. In other words, the CCA data in the SR field may be the same for all STAs for an UL MU transmission.

In an embodiment, the SR related adjustment indicated in the physical layer header part of UL MU PPDU is linked to the SR related adjustment of an immediately preceding frame that includes the trigger information. Thus, SR data in headers 1227, 1237 and 1247 may be derived from SR data in trigger frame 1212. The trigger frame 1212 includes resource allocation information for the wireless stations STA1, STA2, and STA3 to participate in MU uplink transmissions to the AP (e.g., an OFDMA and/or MU-MIMO transmission).

Figure 13:
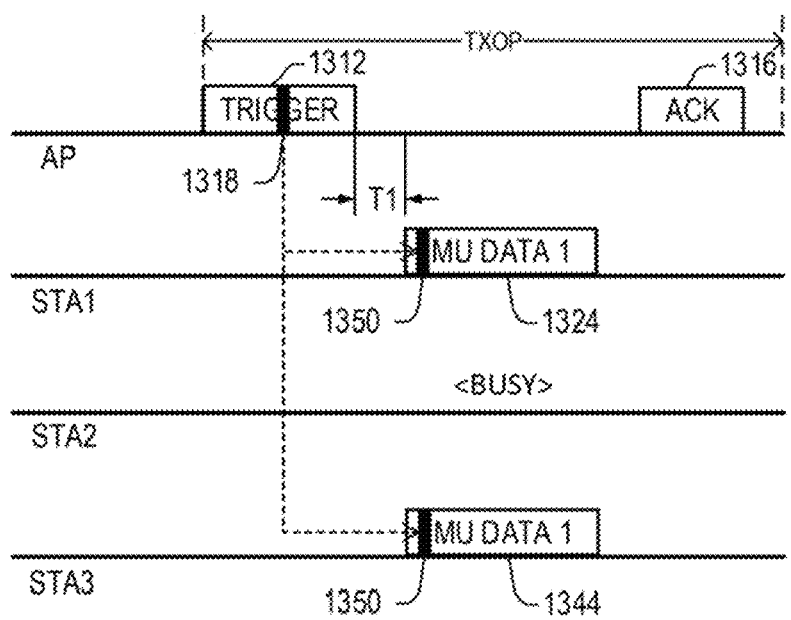
FIG. 13 illustrates MU transmissions in a TXOP according to an embodiment.

FIG. 13 shows an embodiment of MU transmissions. In FIG. 13, the AP performs CCA and establishes a TXOP for MU transmission for STA1, STA2 and STA3. The MU transmission is initiated by the AP's trigger frame 1312, which includes SR data 1318. The SR data 1318 may include, for example, CCA information based on a CCA performed by the AP immediately prior to the TXOP, or CCA information based on default values.

The STAs in the MU session consider the SR information 1318 when deciding wireless channel assessment for the UL MU transmissions. In particular, the SR information 1318 adjusts CCA threshold values for each participating STA. Using the adjusted CCA threshold, STA1 and STA3 assess the wireless medium to be IDLE, but STA2 assesses the wireless medium to be BUSY.

Therefore, only STA1 and STA3 transmits UL MU frames a predetermined time (T1) after receiving the Trigger frame 1312. A physical layer header part of the UL MU frames includes SR fields 1350 whose contents are determined based on the SR information 1318 delivered in the Trigger frame 1312.

Figure 14:
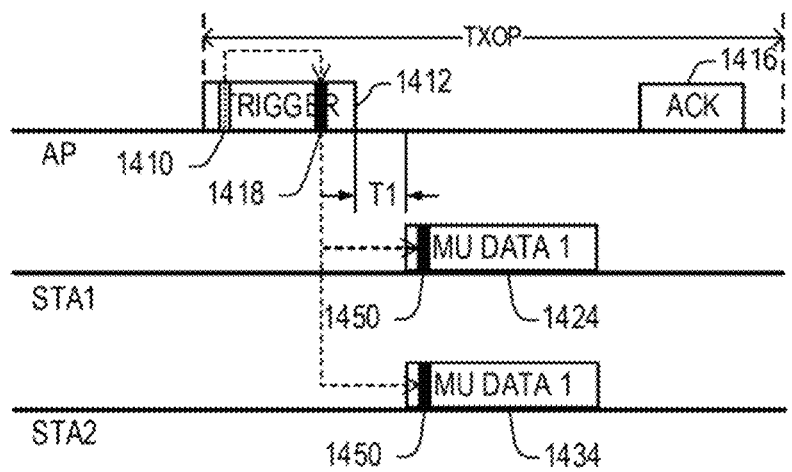
FIG. 14 illustrates MU transmissions in a TXOP according to an embodiment.

FIG. 14 shows an embodiment in which two STAs, STA1 and STA2, are included in a TXOP for MU transmission from an AP. The AP initiates the TXOP with a HE trigger frame 1412 that includes first SR information (SR_AP) 1410 that is indicated in the HE-SIG-A field of the trigger frame. The AP may calculate second SR information (SR_STA) 1418 that is a function of first SR information 1410, and include the second SR information in the payload of the trigger frame 1412.

Subsequently, STA1 and STA2 include the second SR information 1450 in the HE-SIG-A field of their UL MU frames 1424 and 1434, and transmit UL MU frame in T1 time after receiving the Trigger frame.

In an embodiment, when the AP assesses the wireless medium for transmission of the trigger frame 1412, the AP adjusts its CCA threshold value depending on its interference situation, and the first SR information 1410 is a function of the AP's CCA threshold value adjustment. In an embodiment, the second SR information 1418 is identical to the first SR information 1410.

Figure 15:
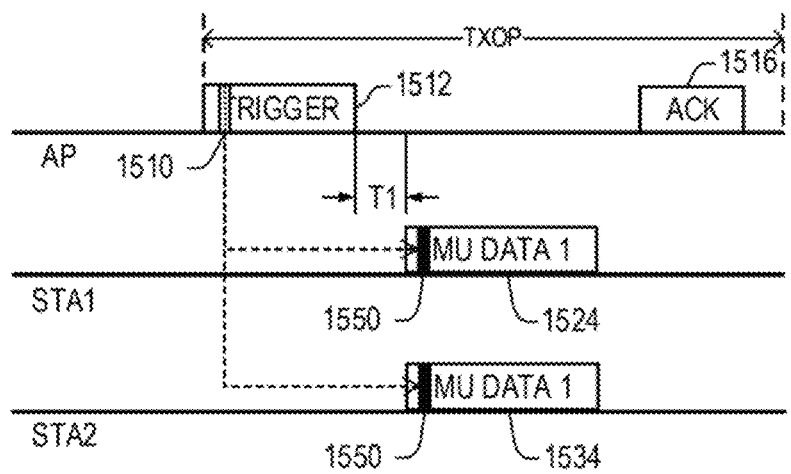
FIG. 15 illustrates MU transmissions in a TXOP according to an embodiment.

FIG. 15 illustrates another embodiment of SR fields in a MU transmission. In the embodiment of FIG. 15, a TXOP for MU transmission is initiated by a HE trigger frame 1512 from the AP in which first SR information 1510 is included in a header of the trigger frame.

After receiving the trigger frame 1510, participating STAs STA1 and STA2 include the same second SR information 1550 in transmitted frames 1524 and 1534, respectively. In an embodiment, the second SR information 1550 is a predetermined function of first SR information 1510, such that different STA can derive the same second SR information.

In an embodiment, when the AP assesses the wireless medium for transmission of the trigger frame 1512, the AP adjusts its CCA threshold value depending on the interference situation, and the first SR information 1510 is a function of the AP's CCA threshold value adjustment. In an embodiment, the second SR information 1550 is identical to the first SR information 1510.

Figure 16:
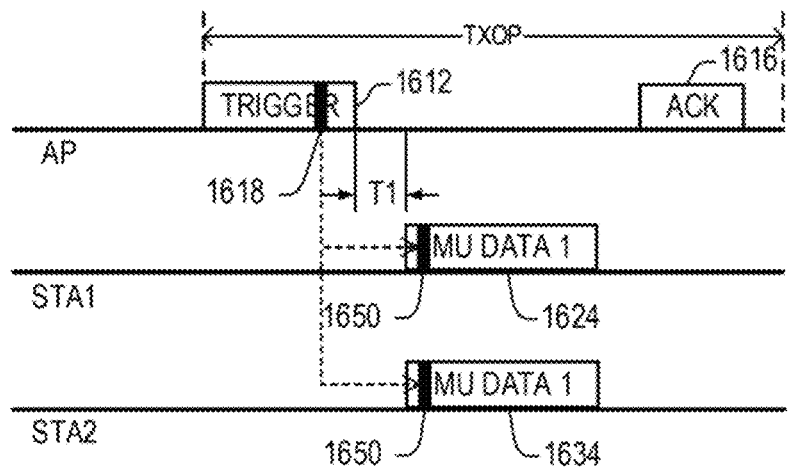
FIG. 16 illustrates MU transmissions in a TXOP according to an embodiment.

FIG. 16 illustrates another embodiment of SR fields in a MU transmission. In the embodiment of FIG. 16, a MU TXOP is initiated by a trigger frame 1612 from the AP that is not an HE trigger frame. For example, the trigger frame 1612 may have a non-HT/HT format or a VHT format. Accordingly, the header of trigger frame 1618 does not include SR information.

When the AP assesses the wireless medium for transmission of the trigger frame 1612, the AP adjusts its CCA threshold value depending on the interference situation. The AP then calculates SR information 1618 to be included in the HE-SIG-A field of UL MU frames 1624 and 1634, which is a function of the AP's CCA threshold value adjustment, and includes the SR information in the payload of the trigger frame 1612. The participating STAs STA1 and STA2 include second SR information 1650 in the HE-SIG-A fields of their UL MU frames 1624 and 1634, and transmit the frames.

Figure 17:
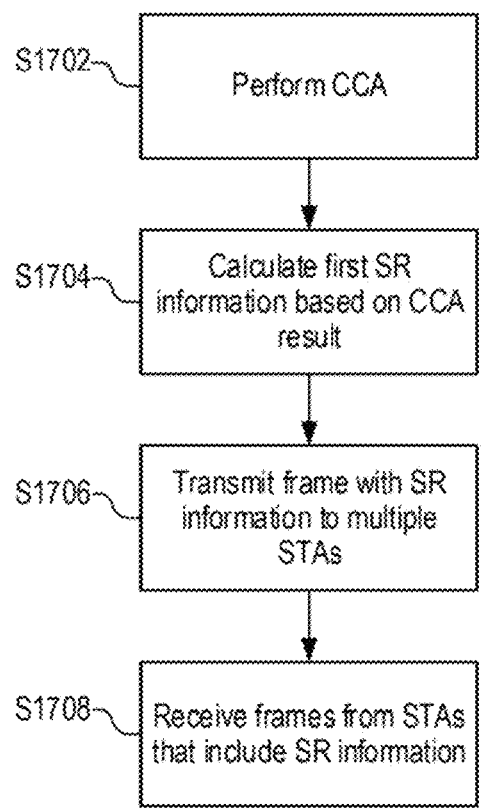
FIG. 17 illustrates a process for spatial reuse according to an embodiment.

FIG. 17 shows a MU process 1700 according to an embodiment that may be performed by an AP. An AP performs clear channel assessment at S1702 and determines that the wireless medium is IDLE under a first CCA threshold condition. The AP then calculates first SR information at S1704 based on the first CCA threshold condition, and transmits a frame that includes second SR information based on the first SR information to a plurality of STAs at S1706. The first and second SR information may be the same, or the second SR information may be a function of the first SR information.

The AP receives frames from one or more of the plurality of STAs at S1708. The frames may include SR information that may be the same information as the SR information transmitted to the STAs by the AP, or a function of the SR information transmitted to the STAs by the AP.

In an embodiment, a CCA condition that may be included in SR information is increasing an AP's CCA threshold value by decreasing the serving AP's transmission power. The SR information may relate to the amount by which the serving AP decreases its transmission power.

In an embodiment, the same condition is maintained for the first CCA threshold condition throughout a beacon period.

In an embodiment, the first CCA threshold condition is only related with adjustment of a CCA threshold when the serving AP identifies a start of a frame, and the frame is transmitted by an OBSS STA.

In an embodiment, information on the first SR information is included in the physical layer payload of the first frame.

In an embodiment, the SR information relates to transmission power.

In an embodiment, the SR information relates to an accepted interference level.

In an embodiment, the SR information relates to a CCA level.

In an embodiment, the physical layer header of the first frame comprises SR information that is based on the first CCA threshold condition.

The SR information transmitted by the AP may relate to the SR information in a frame transmitted by a STA through the following relationship: (AP SR information)=(STA SR information)+Delta. Delta may be a function of a number of STA that the serving AP schedules for UL MU transmission.

From the perspective of a STA, an embodiment of a process for a MU SR field may include receiving the first frame by one or more target STAs, calculating by one or more target STAs, the first SR information based on second SR information, and transmitting, by one or more target STAs, a second frame, wherein the physical layer header of the second frame comprises the first SR information.

In another embodiment, a method for UL MU transmission comprises transmitting, by a serving AP, a first frame to more than one target STAs, wherein a physical layer header of the first frame comprises a second SR information; and receiving, by the serving AP, a second frame from one or target STAs in predetermined time after transmitting the first frame, wherein the physical layer header of the second frame comprises a first SR information, wherein the first SR information is based on the second SR information. The first SR information may be identical to the second SR information. In an embodiment, the first SR information and the second SR information has the following relationship: (first SR information)=(second SR information)+Delta. Delta may be a function of the number of stations that the serving AP schedules for UL MU transmission.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered or not performed in various embodiments. Further, two or more embodiments may be combined.

What is claimed is:

1. A method for performing a multi-user uplink transmission, the method comprising:
receiving, by a first wireless station from a second wireless station, a first frame including a first spatial reuse field and a second spatial reuse field;
analyzing, by the first wireless station, the first spatial reuse field of the first frame;
generating, by the first wireless station, a second frame, wherein the second frame is a data frame and includes a spatial reuse field that is generated based on the analysis of the first spatial reuse field of the first frame; and
transmitting, by the first wireless station, the second frame,
wherein the first frame and the second frame are within a same transmission opportunity (TXOP) and the first frame is transmitted prior to the second frame during the TXOP, and
wherein the second spatial reuse field of the first frame contains information regarding spatial reuse different from that of the first spatial reuse field of the first frame.

2. The method of claim 1, wherein the first frame immediately precedes the second frame.

3. The method of claim 1,
wherein the second frame is a response frame to the first frame.

4. The method of claim 3, wherein the spatial reuse field of the second frame includes a transmit power indication.

5. The method of claim 3, wherein the first frame is a trigger frame.

6. The method of claim 3, wherein the second frame is one of a plurality of frames included in an Orthogonal Frequency Division Multiple Access (OFDMA) uplink (UL) Multi-User (MU) transmission.

7. The method of claim 3, wherein the second frame is one of a plurality of frames included in an Multi-User Multiple-Input Multiple-Output (MU-MIMO) uplink (UL) transmission.

8. The method of claim 1,
wherein the first frame is an initiating frame of the TXOP,
wherein the first frame includes clear channel assessment information in the first spatial reuse field, and wherein the spatial reuse field of the second frame includes transmit power information or clear channel assessment information.

9. The method of claim 1, wherein the spatial reuse field of the second frame is a copy of the first spatial reuse field of the first frame.

10. A wireless device comprising:
a transmitter circuit; and
a receiver circuit,
wherein the wireless device is to:
receive, using the receiver circuit, a first frame from another wireless device;
analyze a first spatial reuse field included in the first frame;
generate a second frame, wherein the second frame is a data frame and includes a spatial reuse field that is generated based on the analysis of the first spatial reuse field of the first frame; and
transmit, using the transmitter circuit, the second frame,
wherein the first frame and the second frame are within a same transmission opportunity (TXOP) and the first frame is transmitted prior to the second frame during the TXOP,
wherein the first frame includes a second spatial reuse field containing information regarding spatial reuse different from that of the first spatial reuse field in the first frame.

11. The wireless device of claim 10, wherein the first frame immediately precedes the second frame.

12. The wireless device of claim 10,
wherein the second frame is a response frame to the first frame.

13. The wireless device of claim 12, wherein the spatial reuse field of the second frame includes a transmit power indication.

14. The wireless device of claim 12, wherein the first frame is a trigger frame.

15. The wireless device of claim 12, wherein the second frame is one of a plurality of frames included in an Orthogonal Frequency Division Multiple Access (OFDMA) uplink (UL) Multi-User (MU) transmission.

16. The wireless device of claim 12, wherein the second frame is one of a plurality of frames included in an Multi-User Multiple-Input Multiple-Output (MU-MIMO) uplink (UL) transmission.

17. The wireless device of claim 10,
wherein the first frame is an initiating frame of the TXOP,
wherein the first frame includes clear channel assessment information in the first spatial reuse field, and
wherein the spatial reuse field of the second frame includes transmit power information or clear channel assessment information.

18. The wireless device of claim 10, wherein the spatial reuse field of the second frame is a copy of the first spatial reuse field of the first frame.

* * * * *